US009705756B2

(12) United States Patent
Low et al.

(10) Patent No.: US 9,705,756 B2
(45) Date of Patent: Jul. 11, 2017

(54) NETWORK VIRTUALIZATION

(75) Inventors: Stephen G. Low, Austin, TX (US);
Paul T. Congdon, Granite Bay, CA (US); Mark A. Pearson, Applegate, CA (US); Charles L. Hudson, Round Rock, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 349 days.

(21) Appl. No.: 14/000,966

(22) PCT Filed: Jun. 2, 2011

(86) PCT No.: PCT/US2011/038847
§ 371 (c)(1),
(2), (4) Date: Aug. 22, 2013

(87) PCT Pub. No.: WO2012/166139
PCT Pub. Date: Dec. 6, 2012

(65) Prior Publication Data
US 2013/0346583 A1  Dec. 26, 2013

(51) Int. Cl.
G06F 15/173 (2006.01)
H04L 12/24 (2006.01)
H04L 12/46 (2006.01)
(52) U.S. Cl.
CPC .......... *H04L 41/50* (2013.01); *H04L 12/4641* (2013.01); *H04L 12/4679* (2013.01)
(58) Field of Classification Search
USPC .................................................. 709/203, 223
See application file for complete search history.

(56) References Cited

U.S. PATENT DOCUMENTS 7,889,728 B2 * 2/2011 Arad et al. ............... 370/389
8,416,790 B1 * 4/2013 Busch et al. .............. 370/401
(Continued)

FOREIGN PATENT DOCUMENTS

CN  101286922 A  10/2008

OTHER PUBLICATIONS

Understanding PBB—Knowledge Base. (n.d.). Captured on Apr. 30, 2011, from http://web.archive.org/web/20110430004549/http://sites.google.com/site/amitsciscozone/home/pbb/understanding-pbb.*

(Continued)

*Primary Examiner* — Mohamed Ibrahim
(74) *Attorney, Agent, or Firm* — Brooks, Cameron & Huebsch, PLLC

(57) ABSTRACT

Embodiments of the present disclosure may include methods, systems, and computer readable media with executable instructions. An example method for network virtualization can include providing, by a datacenter (100) having physical and/or virtual resources, a number of virtual tenant datacenters (tDatacenters), each tDatacenter being isolated from other tDatacenters. A tenant virtual local area network (T-VLAN) (226, 228, 682) is associated to each of the number of tDatacenters, and a value of an end-to-end invariant network virtual local area network (VLAN) identification (VID) label (T-VID) is associated to a particular T-VLAN (226, 228, 682). A network packet associated with the particular T-VLAN (226, 228, 682) is modified at an edge network boundary (561) to include the T-VID. The T-VID is configured to have more than 4096 possible values.

15 Claims, 6 Drawing Sheets

(56) References Cited

U.S. PATENT DOCUMENTS

| | | |
|---|---|---|
| 2007/0067366 A1 | 3/2007 | Landis |
| 2008/0310422 A1 | 12/2008 | Booth et al. |
| 2009/0064288 A1 | 3/2009 | Bagepalli et al. |
| 2010/0058232 A1 | 3/2010 | De Silva |
| 2010/0138830 A1 | 6/2010 | Astete et al. |
| 2010/0241673 A1 | 9/2010 | Wu et al. |
| 2010/0257263 A1 | 10/2010 | Casado et al. |
| 2010/0271938 A1 | 10/2010 | Mutoh |
| 2010/0306415 A1* | 12/2010 | Sultan ............... H04L 12/462 709/249 |
| 2010/0309912 A1* | 12/2010 | Mehta ............... H04L 12/4625 370/390 |
| 2011/0035494 A1 | 2/2011 | Pandey et al. |
| 2011/0069711 A1* | 3/2011 | Jha et al. ............ 370/395.53 |
| 2011/0090911 A1* | 4/2011 | Hao et al. ............ 370/395.53 |
| 2011/0280572 A1* | 11/2011 | Vobbilisetty et al. ......... 398/45 |
| 2011/0283017 A1* | 11/2011 | Alkhatib et al. .............. 709/244 |

OTHER PUBLICATIONS

International Searching Authority, The International Search Report and the Written Opinion, Feb. 9, 2012. 11 Pages.

Office Action, CN Application No. 201180069690.0, Date: Aug. 6, 2015, pp. 1-8.

"IEEE 802.1Q-in-Q VLAN Tag Termination," 2008, pp. 1-16, Cisco Systems, Inc.

Extended European Search Report, EP Application No. 11867048.8, Date: Dec. 23, 2014, pp. 1-7, EPO.

Muneyoshi Suzuki, "802.1ah Provider Backbone Bridges support for DSLAM," Nov. 2005, pp. 1-9.

* cited by examiner

NETWORK VIRTUALIZATION

BACKGROUND

As computing systems decreased in size, and with the advent of client-server computing arrangements, and the availability of less expensive networking, datacenters no longer need be located in a centralized location and/or housed within a specialized data center. Infrastructure associated with the Internet can be used to provide some portion of network resources, such as communications between distributed resources.

Cloud computing can provide on-demand access to computing system resources via a network, such as the Internet, and/or provide software as a service. In previous computing configurations, dedicated datacenter resources, including servers and storage resources, may have been allocated to only a single tenant. Data and software may have been contained on the dedicated datacenter resources. With the advent of cloud computing, a computing system such as a datacenter that can include servers, storage resources, network resources, and/or software, can be provided as needed (e.g., datacenter-as-a-service) to multiple tenants.

DETAILED DESCRIPTION

Figure 1:
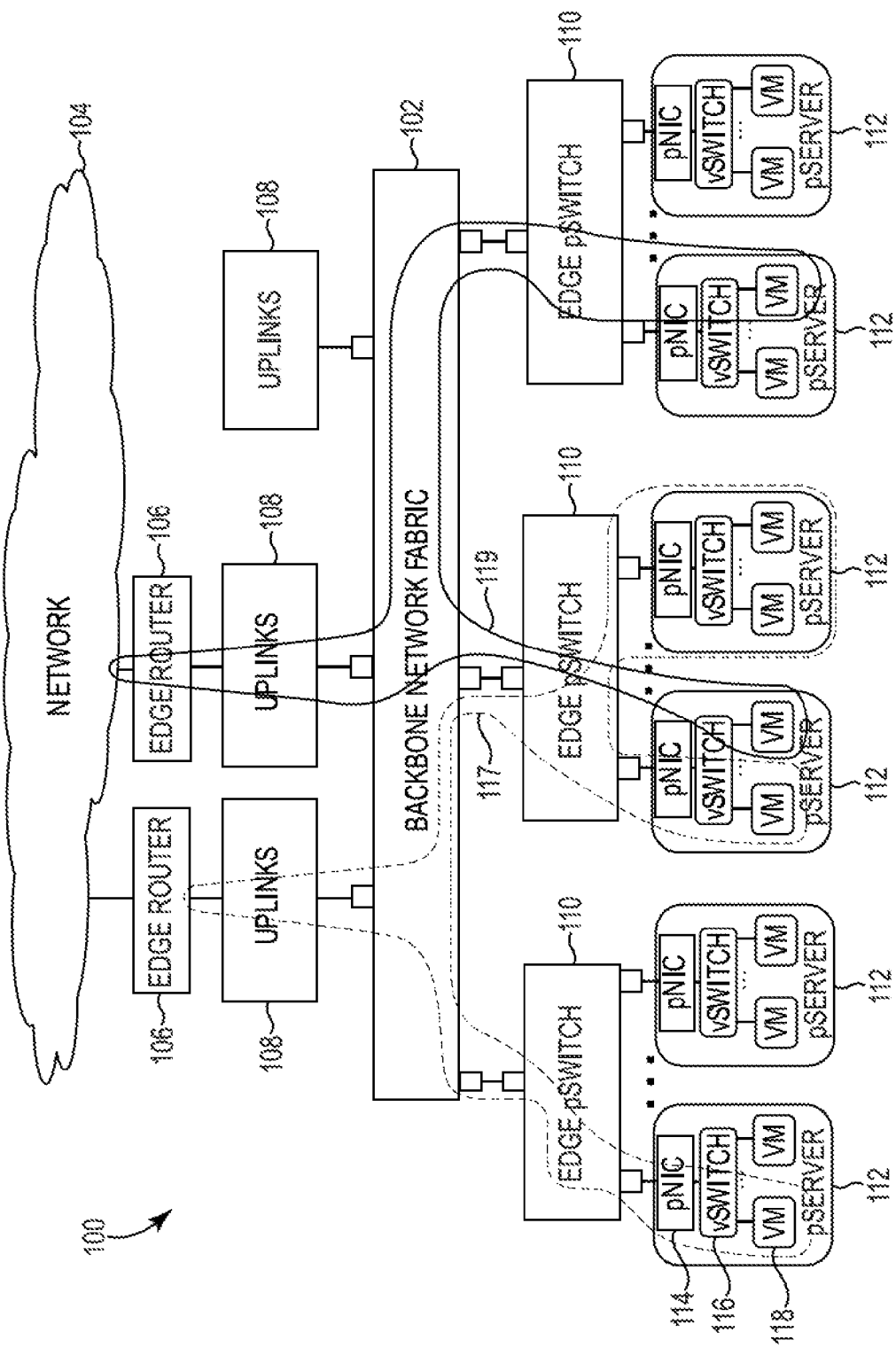
FIG. 1 illustrates an example datacenter according to the present disclosure.

Embodiments of the present disclosure may include methods, systems, and computer readable media with executable instructions. An example method for network virtualization can include providing, by a datacenter having physical and/or virtual resources, a number of virtual tenant datacenters (tDatacenters), each tDatacenter being isolated from other tDatacenters. A tenant virtual local area network (T-VLAN) is associated to each of the number of tDatacenters, and a value of an end-to-end invariant network virtual local area network (VLAN) identification (VID) label (T-VID) is associated to a particular T-VLAN. A network packet associated with the particular T-VLAN is modified at an edge network boundary to include the T-VID. The T-VID is configured to have more than 4096 possible values.

A physical datacenter (pDatacenter), as used herein, is a physical networked computing system for the storage, management, and communication of data (e.g., information). The pDatacenter can include physical resources such as servers, network resources (e.g., backbone network fabric, communications connections, 802.1Q compliant network devices, etc.), storage resources (e.g., memory), physical L4-L7 appliances providing capabilities such as application delivery controllers, load balancing, intrusion prevention, and/or other capabilities and/or hardware components. The pDatacenter may be located in a centralized installation, or have components geographically disbursed.

A datacenter, as used herein, refers to the physical networked computing system (i.e., pDatacenter) but also can include virtual resources such as virtual servers (vServers or virtual machines (VMs)), virtual storage, virtual networking, software operating systems (OS), virtual L4-L7 network services, and/or with applications (e.g., software). A virtual resource indicated with a "v" before the resource, refers to a resource established in software.

The term "datacenter," as used herein, is distinguished from a data center (note: two words) in that a data center refers to an area (e.g., room, building, campus) within which a computing system may be located. Therefore a datacenter may be located within a data center.

The term "tDatacenter," as used herein, refers to a tenant datacenter. That is, a datacenter may be virtualized into multiple tDatacenters. The tDatacenters may have physical and virtual resources (e.g., of the datacenter) that are allocated to a particular tDatacenter, and thus dedicated to a particular user (e.g., tenant of the tDatacenter). A tDatacenter can be isolated from other tDatacenters of the datacenter in that the resources (e.g., servers, storage resources, etc.), data, and software, allocated to one tDatacenter are not available to other tDatacenters. That is, a tDatacenter is not aware of the resources, data, and/or software associated to other tDatacenters, and users of the tDatacenter do not have access to the resources, data, and/or software associated with other tDatacenters.

More than one tDatacenter may utilize a resource that is shared with another tDatacenter. However, the respective tDatacenters will not be aware that the resource is being shared. For example, a physical server may have multiple virtual machines (VMs) implemented thereon, with some of the multiple VMs being associated with one tDatacenter and others of the multiple VMs being associated with one or more other tDatacenters. Thus, each tDatacenter may be aware of the physical server and the presence of the VMs associated with one particular tDatacenter, but will not be aware of those VMs that are associated with the other tDatacenters, or even the fact that the physical server is necessarily being shared with one or more other tDatacenters.

Institute of Electrical and Electronics Engineers (IEEE) 802.1Q is limited to less than 4096 customer virtual local area networks (C-VLANs), primarily attributable to unique addressing constraints, which can hinder scalability of the number of VLANs necessary to support a large number (i.e., more than 4096) tDatacenters (assuming at least one VLAN per tDatacenter and that a given VLAN is assigned to only one tDatacenter for isolation reasons). The IEEE 802.1Q standard also defines 4096 stacked VLANs (S-VLANs). S-VLANs using IEEE 802.1ad (better known as "QinQ") protocols can identify approximately sixteen million discrete VLANs. However, in many datacenter usage models, S-VLANs are consumed in the edge to provide multi-channel support. Additionally, S-VLANs do not provide MAC virtualization to support scaling to large numbers of VMs.

The IEEE 802.1Qah Provider Backbone Bridging (PBB) standard provides for MAC-in-MAC encapsulation of user Ethernet packets for transport on a providers network, which may be applied to a datacenter where the provider network is the Datacenter Backbone L2 Fabric (DBLF) having user networks configured as VLANs in the edge regions of the datacenter. However, IEEE 802.1Q standard VLANs require a translation of the 12 bit VLAN identification (VID) labeling for VLANs in the edge to the 24 bit service identifier (e.g., Backbone Service Instance Identifier (I-SID)) in the PBB frames. The need for translation does not provide an end-to-end unique invariant label corresponding to a particular VLAN. Furthermore, depending on the particular topology of VLANs, the total available end-to-end VLANs available for some datacenter configurations may still be as few as 4096. Non-Ethernet native solutions (e.g., virtual private LAN service (VPLS), multi-protocol label switching (MPLS)) lacks support for adoption in a datacenter in which Ethernet is the dominant technology.

Therefore, according to a previous approach, a datacenter may be virtualized into, for example, 4096 tDatacenters, each tDatacenter having a VLAN and using invariant labels, to which physical and virtual resources of the datacenter may be allocated and assigned on an as needed basis (e.g., datacenter-as-a-service). In a commercial cloud computing environment, 4096 possible tDatacenters can significantly limit the number of tenants that can use the cloud to obtain datacenter-as-a-service. According to one or more embodiments of the present disclosure, methods and apparatus are provided to virtualize a datacenter into more than 4096 tDatacenters.

One or more networks can be implemented on a datacenter, such as physical local area networks (PLANS) and/or virtual local area networks (VLANs). A particular type of VLAN that is associated with a particular tDatacenter is referred to herein as a T-VLAN. Packets communicated within a datacenter can include an end-to-end invariant VID that identifies the packet as being associated with a particular VLAN. More specifically, a tenant VID (T-VID) can be an end-to-end invariant VID that identifies a packet as being associated with the particular T-VLAN.

According to one or more embodiments of the present disclosure, a datacenter can be virtualized into more than 4096 tDatacenters and provide network isolation by provisioning T-VLANs using a T-VID that is larger than conventional VIDs. According to various embodiments, a T-VID having more than 12 bits can be used that can support more than 4096 T-VLAN instances on a datacenter. For example, a 24 bit T-VID can support more than 16 million T-VLANs. According to some embodiments, at least one T-VLAN can be allocated to each tDatacenter. Therefore, virtualizing T-VLANs using a 24 bit T-VIDs and allocating one T-VLAN per tDatacenters, more than 16 million tDatacenters can be implemented on a datacenter. However, embodiments of the present disclosure are not limited to having a single T-VLAN allocated to a tDatacenter. That is, one or more T-VLANs may be assigned to each tDatacenter for network connectivity within a given tDatacenter while still enabling virtualization of more than 4096 tDatacenters per datacenter according to embodiments of the present disclosure.

FIG. 1 illustrates an example datacenter according to the present disclosure. Embodiments of the present disclosure are not limited to the particular datacenter 100 arrangement and/or component configuration shown in FIG. 1, which is greatly simplified. Datacenter 100 may include different quantities and types of resources (e.g., servers, network resources, storage resources) than those shown in FIG. 1. For example, a datacenter 100 can include other and/or different computing devices. Datacenter 100 may be a portion of a larger computing system that can include client computing devices and/or other portions of the datacenter communicatively coupled to the network 104 (e.g., Internet).

FIG. 1 illustrates an Ethernet network architecture to enable the further virtualization of datacenter 100 into a large number tDatacenters. The tDatacenters can be tenant context virtualized datacenters. As discussed above a tDatacenter appears to a user as a discrete datacenter that is isolated from other datacenters. Physical servers (pServers) and/or software-based virtual servers (vServers), storage resources, and networking resources from a common underlying datacenter can be allocated to potentially tens of thousands (or more) tDatacenters. For example, the number of pServers and vServers may exceed ten's of thousands and the quantity of virtual machines (VMs) may exceed hundreds of thousands while continuing to use an industry standard IEEE 802.1Q datacenter backbone fabric.

For simplicity, datacenter 100 illustrated in FIG. 1 shows servers (e.g., pServer 112) and network resources (e.g., backbone network fabric 102, edge routers 106, uplinks 108, edge physical switches 110), and does not show storage resources. Storage resources can be communicatively coupled to one or more of the servers. Storage resources can include physical drives (e.g., hard disk drives, solid state drives) or other physical non-transitory memory devices. Physical storage resources can correspond to virtual memory allocations that are associated with other physical and virtual resources.

As shown in FIG. 1, datacenter 100 can include a backbone network fabric 102 communicatively coupled to a network 104 via one or more edge routers 106 and uplinks 108. A plurality of pServers 112 can be communicatively coupled to the backbone network fabric 102 through a number of edge physical switches (pSwitches) 110. The pServers 112 can include a physical network interface controller (pNIC) 114. One or more VMs 118 can be implemented on a pServer 112, the VMs 118 being coupled to a pNIC 114 through a virtual switch (vSwitch) 116. VMs 118 may be configured and/or operated as a vServer.

The datacenter 100 can include more or fewer edge routers 106, uplinks 108, edge pSwitches 110, pServers 112, pNICs 114, VMs 118 and/or vSwitches 116 than are shown in FIG. 1. Furthermore, the arrangement and/or configuration of the components within the datacenter 100 may be different than shown in FIG. 1, and datacenter 100 can further include storage resources (not shown) in any compatible arrangement.

In one example implementation, the pServer 112 end-nodes can be blade servers ("blades") in a rack, such as a Hewlett-Packard BladeSystem chassis, Ethernet end-nodes can be pNICs 114 or virtual network interface controllers (vNICs), among other end-node entities. The edge pSwitches 110 can also be located in rack (e.g., in switch modules or at the top of the rack).

The backbone network fabric 102 can be a low latency, high cross-sectional bandwidth Ethernet network, according to one example implementation. The backbone network fabric 102 may utilize multipath and/or hash routing mechanisms. As FIG. 1 is a simplified representation of a datacenter 100, certain details have been omitted, such as those components that may achieve dual redundancy of the datacenter fabric 102 for high availability. According to one or more examples of the present disclosure, datacenter 100 can include thousands of edge pSwitches 110, tens of thousands of pServers 112, and/or hundreds of thousands of VMs 118, or more.

A tenant context (an application discussed further with respect to FIG. 2) may execute directly on a pServer 112, or may execute on a VM 118 hosted on a hypervisor executing on a pServer 112. A hypervisor, also called a virtual machine monitor, is a virtualization technique executing on a server to provide a platform on which to execute multiple operating systems (OSs) concurrently, thereby supporting multiple VMs on a host pServer. A vSwitch 116 may be implemented in a hypervisor or within a pNIC 114.

The uplinks 108 are network appliances that can include OSI layer 4-layer 7 (L4-L7) datacenter services related to communications with the network 104, including security services such as firewalls and intrusion prevention systems (IPS), load balancing, and application delivery controller (ADC) services. Layers L4-L7 refer to a transport layer, session layer, presentation layer, and application layer respectively. Uplinks 108 connect to one or more networks 104 (only one network is shown in FIG. 1 for simplicity) through an associated edge router 106. Network appliances with L4-L7 service may also be present as a datacenter resource independent of the uplinks 108.

According to one or more examples of the present disclosure, a datacenter is provided having a multi-tenant architecture so that the physical and virtual resources of the datacenter can be efficiently and securely shared. A tenant, as used herein, refers to a user permitted to share the physical and virtual resources of a datacenter. However, the architectures and techniques described by the present disclosure are distinguished from a physical segregation of the resources of a datacenter corresponding to individual tenants. The network virtualization techniques of the present disclosure are not mutually exclusive of, and therefore can supplement, physical segregation approaches.

Physical and virtual components of datacenter 100 can be used to implement one or more tenant networks (tNetworks), such a first tNetwork 117 and a second tNetwork 119. As shown in FIG. 1, the first tNetwork 117 can be implemented using a portion of VMs 118 and the second tNetwork 119 can be implemented using another portion of VMs 118. More specifically, the first tNetwork 117 can be implemented using a portion of VMs 118 from a particular pServer 112, and the second tNetwork 119 can be implemented using another portion of VMs 118 from the same pServer 112, in some examples. A tNetwork can also be implemented using an entire particular pServer 112, including all of the VMs 118 thereof, as shown in FIG. 1. First 117 and second 119 tNetworks can correspond to a same or different datacenter 100 tenant, for example. Embodiments of the present disclosure are not limited to any particular tNetwork configuration. A tDatacenter can have one or more tNetworks, as is discussed further with respect to FIG. 2.

Figure 2:
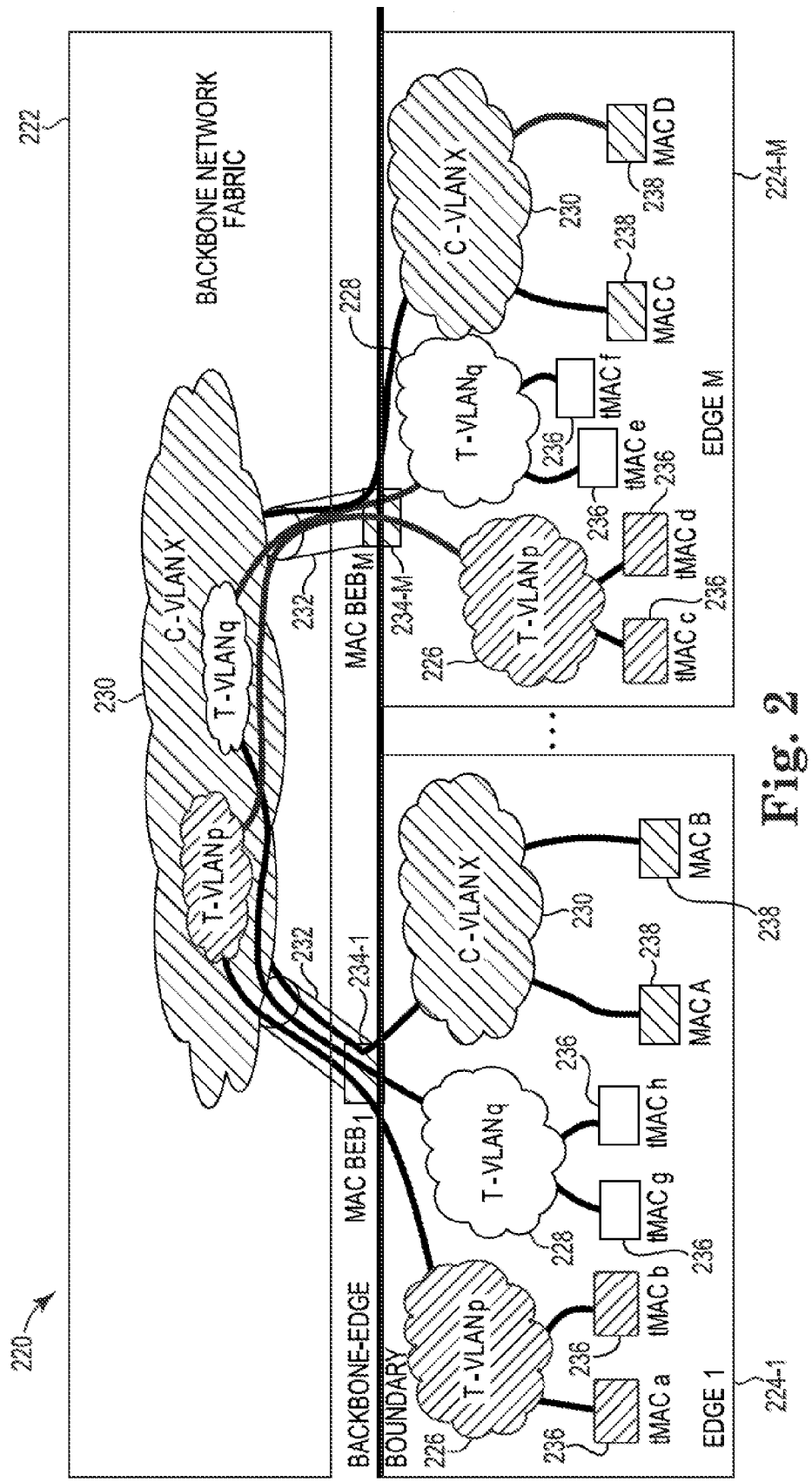
FIG. 2 illustrates an example network having an architecture to support the virtualization of datacenter into many independent tDatacenters according to the present disclosure.

FIG. 2 illustrates an example network having an architecture to support the virtualization of datacenter into many independent tDatacenters according to the present disclosure. In order to support a multi-tenant architecture, a datacenter can be virtualized into multiple tDatacenters, which may include pServers, vServers, and corresponding storage and networking resources. As a virtual creation, a tDatacenter can be used to provide a "datacenter-as-a-service," for example, as a cloud computing service.

A tenant context is an application or set of applications owned by a tenant that executes on a datacenter. According to various examples of the present disclosure, a tDatacenter can correspond to a particular tenant context. Each tenant context "sees" a tDatacenter associated with the respective tenant context and does not "see" those tDatacenters associated with other tenant contexts. Each tenant context can manage physical and virtual datacenter resources within its tenant context, such as MAC addresses, VLANs, pServers, vServers, etc. A tDatacenter corresponding to a tenant context can have one or more tNetworks, such as are shown in FIG. 1. A tenant may have many tenant contexts, depending on the scope and scale of tenant computing needs. For example, tenant contexts can include a customer-facing web application, an internal financial (e.g., payroll) application, a supply chain management system, and so forth.

A tDatacenter associated with a tenant context can have at least one physical or virtual server with supporting storage resources and L2 networking. A more complex tDatacenter can have upwards of thousands of physical and/or virtual servers with supporting storage resources and L2/L3 networking and L4-L7 network services. The tDatacenter configurations can be created through automated processes such as a datacenter automation tool and its associated orchestration tools, which can place and route the tDatacenter instances in the datacenter. Physical or virtual servers, network resources, storage resources, and/or network services can be assigned to a tDatacenter to implement the configurations. The tDatacenter virtualization of the present disclosure is distinguished from the physical and/or virtual hardware and/or software virtualization of previous approaches at least by the use of a T-VID having more than 12 bits.

FIG. 2 shows a multi-tenant Ethernet L2/L3 network 220 having an architecture to support the virtualization of datacenter into many independent tDatacenters (e.g., a datacenter can be virtualized into multiple tDatacenter "slices") that can be associated with tenant contexts. Layers L2/L3 refer to the OSI model data link layer and network layer respectively. Network 220 may be architecturally segmented into a backbone network fabric 222 and a number of disjoint edge regions, including a first edge region 224-1, . . . , and an $M^{th}$ edge region 224-M. An edge region is disjoint if a packet has to traverse the backbone to travel between points on the disjoint edge region. Otherwise, the edge region is a single edge region.

Network 220 can have a backbone edge bridge (BEB) at each boundary, such as MAC $BEB_1$ 234-1 shown at the boundary of edge 1 and MAC $BEB_M$ 234-M shown at the boundary of edge M. The location of the BEB depends on the particular network implementation. For example, a BEB may be implemented in vSwitches or in adjacent pSwitches. Where a BEB may be implemented in vSwitch, edge regions can be entirely implemented a virtual networks (vNetworks) and thus require no changes to hardware for correct behavior.

FIG. 2 further shows a C-VLAN 230 having portions virtually located within the backbone network fabric 222 and extending to the edge regions 224-1 and 224-M of network 220 implemented according to the IEEE 802.1Q networking standard. Edge regions 224-1 and 224-M represent edge region and edge region M respectively. Additional edge regions are contemplated, but not shown in FIG. 2 for simplicity. C-VLAN 230 is labeled as C-VLAN X in FIG. 2 to indicate that it may be one of many C-VLANs created within network 220. C-VLAN 230 is shown having a number of C-VLAN end-nodes 238 in each of edge regions 224-1 and 224-M. C-VLAN end-nodes 238 have unique MAC addresses (e.g., MAC A, MAC B, MAC C, MAC D).

FIG. 2 also shows several T-VLANs associated with C-VLAN 230, including T-VLANp 226 and T-VLANq 228. T-VLANs 226 and 228 are shown having a number of T-VLAN end-nodes 236 in each of edge pSwitches 224-1 and 224-M. T-VLAN end-nodes 236 can also have unique virtual MAC addresses (e.g., tMAC a, tMAC b, tMAC c, and tMAC d associated with T-VLANp; tMAC e, tMAC f, tMAC g, and tMAC h associated with T-VLANq).

As mentioned briefly above, MAC $BEB_1$ 234-1 shown at the boundary of edge 1 and MAC $BEB_M$ 234-M shown at the boundary of edge M. Tunnels 232 are shown in FIG. 2 for packet forwarding between the backbone network fabric 222 and respective ones of the edge regions 224-1 and 224-M. Although the tunnels are depicted as physical structures in FIG. 2, it will be appreciated that tunnels 232 can be implemented virtually during packet forwarding via packet encapsulation techniques. The respective tunnels 232 terminate at MAC $BEB_1$ 234-1 and MAC $BEB_M$ 234-M.

The backbone network fabric 222 can be a IEEE 802.1Q compliant network with existing network 220 implementations. The backbone network fabric 222 can support one or more C-VLANs, as well as S-VLANs used for multichannel. An IEEE 802.1Q network can be implemented with pSwitches that do not comprehend T-VLANs, as is discussed further below. The disjoint edge regions 224-1, . . . , 224-M may therefore be between the backbone network fabric 222 and the NICs of the pServers and/or vServers.

The multi-tenant datacenter of the present disclosure can provide more than 16 million T-VLANs and/or 4096 C-VLANs that can be allocated among tDatacenters and supported using PBB encapsulation techniques described further below. According to examples of the present disclosure, T-VLANs that can be associated with a tDatacenter and assigned to tenant contexts are an evolution from C-VLANs of 802.1Q datacenter networks. A datacenter network can be virtualized into C-VLANs labeled by a 12 bit customer VLAN identification (C-VID) in a C-Tag portion of a frame. The C-VID is unique within the datacenter scope. Each of the 4096 possible C-VLANs is an independent broadcast domain. The C-VLANs may be implemented in physical pSwitches and/or vSwitches. The corresponding pNICs and/or vNICs can be addressed by the usual 48 bit MAC addresses that are unique within the scope of each respective C-VLAN.

With respect to C-VLANs, packet forwarding can use a learning cache to resolve the C-VID and destination MAC address (DMAC) to determine the port(s) that a particular packet is to be sent out. For example, the C-VID and DMAC can be looked-up in a table to determine the port(s). If the DMAC is for a unicast, then a single port is determined, and if the DMAC is for a multi-cast group, then a port list is determined. A broadcast MAC can return a port list for all ports used by a particular C-VLAN.

The T-VLANs can have the same semantics as C-VLANs except for the larger address space (e.g., 24 bits) used to label T-VLAN instances. All the mechanisms of VID assignment, forwarding, learning/flooding, EVB/virtual Ethernet port aggregator (VERA) that are applicable from the IEEE 802.1Q standard with respect to packets having a C-VID are applicable to packets having the larger T-VID.

Figure 3:
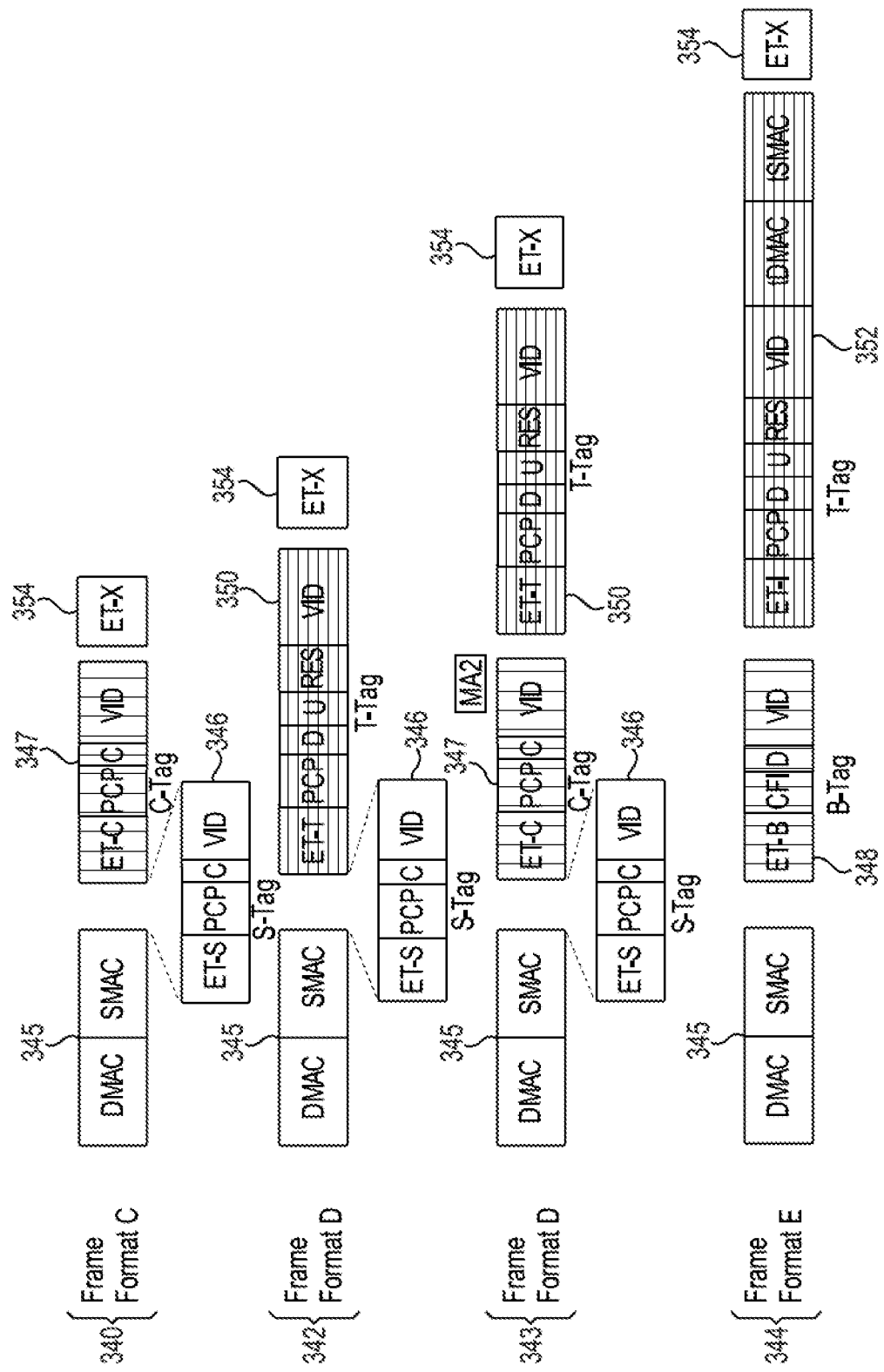
FIG. 3 illustrates example frame definitions associated with a multi-tenant datacenter computing system according to the present disclosure.

FIG. 3 illustrates example frame definitions associated with a multi-tenant datacenter computing system according to the present disclosure. As previously discussed, a T-VID is a unique end-to-end invariant network identification label that can have more than 4096 possible values and be used to uniquely label a T-VLAN (e.g., as an edge T-VLAN or a PBB service instance in the backbone network fabric). That is, a T-VID can identify packets that are associated with a particular T-VLAN. As such, T-VIDs may be used to enforce easily verifiable isolation between T-VLANs.

A network packet can be modified at an edge network boundary to add or remove a T-VID. As used herein, an edge network boundary refers to a server-to-network interface, including but not limited to a virtual server to network interface. The T-VID added/removed may be based on an end-point tMAC address and the particular T-VLAN to which the tMAC address corresponds. A packet modified with to include a T-VID can then be forwarded based on the T-VID.

According to various examples, a T-VID may be assigned to the packet at virtual switch (vSwitch) ports interfacing with virtual network interface controllers (vNICS) of VMs or physical switches (pSwitch) ports interfacing with physical network interface controllers (pNICs) of pServers. Virtual network components, such as vSwitches, vNICs, vServers, and VMs can be implemented in software, whereas physical network components, such as pServers, pSwitches, and pNICs, are implemented in hardware. For example, a vSwitch may be implemented in software such as in a Hypervisor.

According to a number of embodiments, a BEB can encapsulate each T-VLAN as an IEEE 802.1Qah provider backbone bridging service instance in a standard PBB frame. A change to the standard is that the B-VLAN Ethertype may be globally configured to be a C-VLAN Ethertype (in addition to the S-VLAN Ethertype specified by the standard). The service ID of the frame can be set equal to the T-VID of the T-VLAN. In this manner, a 24 bit T-VID can be used to enable more than 16 million T-VLANs to be supported independent of topology. The encapsulation function of a frame into an IEEE 802.1Qah frame may take place in the vSwitch or in an adjacent pSwitch. When the encapsulation function of the frame into an IEEE 802.1Qah frame takes place in the pSwitch, the virtual Ethernet port aggregator (VEPA) 802.1Qbg mode generalizes straightforwardly.

The T-VID may be used to filter and enforce isolation at either vNICs or pNICs that is directly verifiable. The T-VID may be used to identify packets of a T-VLAN for monitoring in transit (i.e., "on the wire"). The unique and end-to-end invariant T-VID may be encoded in multiple protocols and their associated frames for the end-to-end transport of the information within a datacenter. The T-VID may also be used to define forwarding behavior for unicast, multicast, and broadcast packets. By including a T-VID, end-node addresses (e.g., MAC addresses) need only be unique within the context of a particular T-VLAN, since the T-VID uniquely identifies the T-VLAN.

One advantage of the Multi-tenant datacenter architecture and techniques of the present disclosure is that the core Open Systems Interconnection (OSI) layer two (L2) (i.e., data link layer) fabric over which the packets may transported can be a standard IEEE 802.1Q network using standard 802.1 Qah encapsulated packets, including packet configurations having the B-Tag replaced with a C-Tag. The multi-tenant datacenter architecture and techniques of this disclosure also provide a many-to-one ratio of end-node MAC addresses and outer MAC addresses of the encapsulation, which can reduce forwarding table requirements of the core 802.1Q network.

FIG. 3 illustrates frames of IEEE 802.1Q packets for direct datacenter backbone communication, as well as frames of IEEE 802.1Qah encapsulated T-Tag and T-VLAN header for T-VLAN packets being tunneled through the backbone network (e.g., via tunnels 232 shown in FIG. 2). FIG. 3 shows an IEEE 802.Qah Frame Format C at 340, having a MAC address portion 345, including a destination MAC address (DMAC) and a source MAC address (SMAC), followed by an optional S-Tag 346, a C-Tag 347, and the Ethertype of the payload (ET-X) 354. A Frame Format ID is shown at 342, having a MAC address portion 345, including DMAC and SMAC, followed by an optional S-Tag 346, and terminating with the Ethertype of the payload (ET-X) 354. However, the Frame Format D includes a T-Tag 350 in place of the C-Tag 347 included in Frame Format C. Another Frame Format. D version is also shown in FIG. 3 at 343, having a MAC address portion 345, including DMAC and SMAC, followed by an optional S-Tag 346, an optional C-Tag 347, a T-Tag 350, and concluding with the Ethertype of the payload (ET-X) 354. Finally, FIG. 3 shows an IEEE 802.Qah Frame Format E at 344, having a MAC address portion 345, including DMAC and SMAC, followed by a B-Tag 348, a T-Tag 350, and concluding with the Ethertype of the payload (ET-X) 354.

IEEE 802.1Q compliant frames having the optional C-Tag 347 that enables up to 4096 VLANs labeled by a 12 bit VID. The optional S-Tag 346, having an additional 12 bit VID, may be inserted in a frame in front of the C-Tag (e.g., included in Frame Formats C 340 and D 343) or the T-Tag (included in Frame Format D 342) to enable multi-channel support. A B-Tag is identical to either an S-Tag or a C-Tag depending on whether the B-Tag includes an Ethertype ET-S or ET-C as the ET-B portion. According to various examples, a default configuration can be for the B-Tag to have an Ethertype of a C-Tag. The IEEE 802.1Qah definition is for the B-Tag is to have the Ethertype of an S-Tag.

The C-Tag in the Frame Format D 343 is optional. If it is present, it enables the packet to be transported over IEEE 802.1Q bridges without modification provided that the MAC addresses have C-VLAN scope. The optional C-Tag also enables a PBB C-VLAN tunnel that a given T-VLAN uses to be specified at the edge. Frame Formats D enable the boundary between the backbone network fabric (that forwards using 12 bit VIDs) and the edge networks (that forward using 24 bit VIDs) to be located in the vSwitch or the adjacent pSwitch.

As mentioned above, a T-Tag can be a new tag with a new Ethernet type. A T-Tag can have a VID (e.g., T-VID) having more than 12 bits (e.g., 24 bit VID), which can be used to uniquely label more than 4096 VLANs. In some configurations, a T-Tag can be used to uniquely label up to approximately sixteen million VLANs, or more. The T-VID is unique with global datacenter scope, providing network end-to-end invariability. The T-VID can also have an additional byte that includes 4 bits of Priority Code Points (PCP) and drop eligibility (D) that are also carried end-to-end. The 24 bit T-VID and PCP remain in the frame end-to-end and can be used to verify VLAN membership.

The additional bits of the T-VID enable more than 4096 VLANs to be defined compared to the 12 bits of a C-Tag VID. If all network components could process VIDs having more than 12 bits within the T-Tag, increasing the quantity of available VLANs would simply be a matter of replacing C-Tags with T-Tags to label the VLANs. However, some legacy pSwitches do not have the capability to process a VID with more than 12 bits within the T-Tag. Therefore, implementing a datacenter with large scale network virtualization supporting approximately 16 million VLANs, can require incompatible pSwitches to be replaced or upgraded.

Tunneling, which is achieved by encapsulation of a packet, allows the T-VID to travel with a packet. However, the inclusion of an encapsulation header may cause a packet to exceed a standard frame size. This requires network support for 802.3as-2006 Ethernet Frame Expansion (also 802.3-2008) envelope frames, which allow encapsulation of 1500 octets of client data with up to 482 octets of encapsulation header and a maximum frame size of 2000 octets.

The C-VID mapping in the T-VID used to enable backbone networks to be presented to end-nodes using a T-VLAN structure. Some T-VLAN VIDs (4096) are reserved. The upper 12 bits can be set to 0x001 and the lower 12 bits can be the C-VID of the backbone network VLAN. The tDA and the tSA are likewise set directly to the backbone destination address (DA) and source address (SA). Embedding of backbone VLANs in the T-VLAN structure eliminates an exception path to handle un-encapsulated packets at the BEG that considerably simplifies the control plane.

T-VLAN forwarding (e.g., T-VID and tDA are resolved to port(s) such as by look-up) can be equivalent to resolving to port(s) using C-VID and DA (standard backbone network forwarding). Thus, with this encapsulation, 4096 possible C-VLANs can be treated in the edge region just as T-VLANs with T-VIDS in the range T-VID address range 0x1 000 to 0x1 FFF. As such the architecture with C-VLANs in the edge is equivalent to an 802.1Qah network. Inclusion of a T-Tag within a frame is straightforward to accomplish in vSwitches at the edge of the network and for a subset of pSwitches adjacent to the pNICs.

According to various examples, a T-VLAN may have an optional C-Tag associated with it in addition to the T-Tag. In the backbone network fabric (e.g., 222 shown in FIG. 2), packet forwarding in a T-VLAN can resolve port(s) using C-VID and DMAC. In the edge regions, port(s) can be resolved using T-VID and DMAC. In the backbone network fabric, the T-VLANs tunnel in the associated C-VLAN. Forwarding in the edge does not depend on the C-VID since a T-VID is unique within an entire datacenter scope, not just within a C-VLAN, scope.

Encapsulation and decapsulation are introduced into a PBB 802.1Qah frame at the edge/backbone boundary. This network function encapsulates a packet in a MAC frame that has the MAC addresses of the BEBs (i.e., backbone MAC (B-MAC)) with the tunnel entry/exits, which accomplishes that the inner MAC addresses need only be unique within a T-VLAN scope since the inner MAC addresses are used for forwarding only in the edge regions. MAC addresses within a T-VLAN scope are referred to as tMAC addresses. The tMAC addresses may be managed entirely within the context of a tDatacenter.

Finally, if there is a many-to-one relation between a tMAC and an encapsulating MAC, the encapsulation minimizes the number of MAC addresses visible in the backbone network fabric. Some implementations can result in ratios of 50:1, or more. Large ratios reduce the number of MAC addresses that bridges in the backbone network fabric have to manage, facilitating scaling to hundreds of thousands of VMs. Some pSwitch forwarding caches can manage approximately 64,000 entries. With a 50:1 ratio, encapsulation enables the backbone bridges to support a datacenter with approximately 100,000-250,000 VMs in the edges. The tMAC addresses have T-VLAN scope and therefore the entire MAC address space can be administered from within the tDatacenter to which a T-VLAN is assigned.

Figure 4:
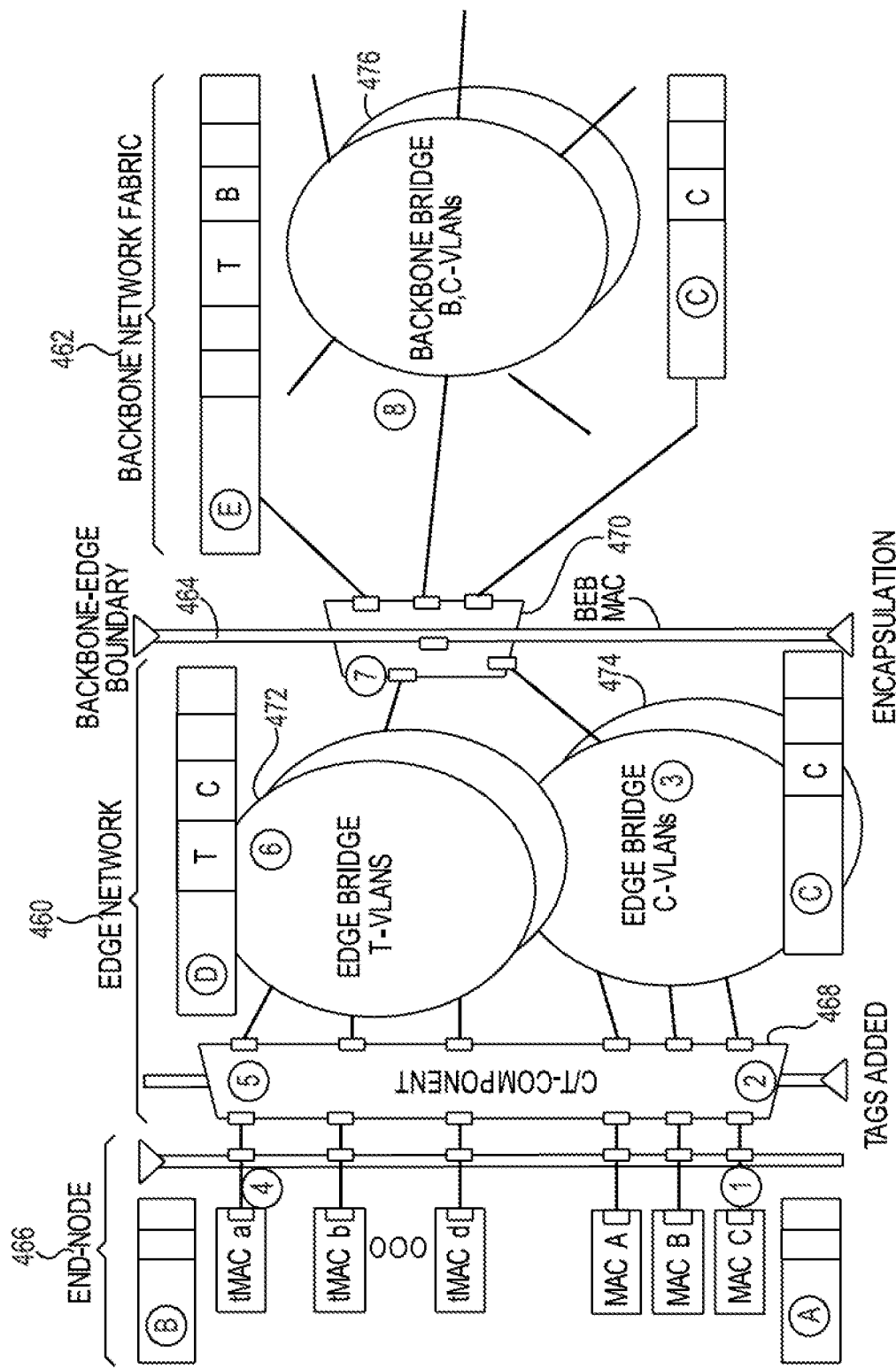
FIG. 4 illustrates a backbone-edge bridge for T-VLANs according to the present disclosure.

FIG. 4 illustrates a backbone-edge bridge for T-VLANs according to the present disclosure. FIG. 4 illustrates a Backbone-Edge Bridge (BEB) architecture for T-VLANs and C-VLANs. PBB was originated to address providing a single Ethernet network with diverse geographical locations on a metropolitan or larger scale. The basic model is that there are a set of users at different locations that tunnel through a backbone Ethernet network. There are some differences between the original usage model that drove the IEEE 802.1Qah definition and the usage model for tDatacenters.

One difference in the original PBB model is that backbone VLANs (B-VLANs) act only as tunnels for networks and are not presented directly to the end-nodes in the edges, in contrast to the C-VLAN 230 shown in FIG. 2, which extends from the backbone network fabric 222 to edge regions 224-1 and 224-M. C-VLANs in the edge regions may be configured as a "standard" C-VLAN, a tunnel B-VLAN, or a hybrid between the two. A "standard" C-VLAN provides an end-to-end VLAN that traverses the edge and backbone to provide a 'legacy' C-VLAN, but does not provide tunnels for the T-VLANs, and are not generally assigned to individual tDatacenters. C-VLANs that are purely tunnels are not exposed in the edge regions. The set of C-VLANs that provides T-VLAN tunnels needs to be adequate for the backbone multi-path model such as Shortest Path Bridging and Hash Based Routing. Hybrid C-VLANs are used both as C-VLANs and tunnels for T-VLANs.

The PBB model assumes standard 802.1Q networks. Mapping of a network to a I-SID at the E-Component of the BEB was based on the physical port and possibly a C-Tag or S-Tag in the network packets. The tunnel is determined by a table in the BEB that maps each I-SID onto a B-VID for the tunnel. According to the multi-tenant architecture of the present disclosure, T-VLANs have a 24 bit T-Tag that maps directly to the I-SID with a change of Ethertype. If a C-Tag is present, it may be used to map directly to a B-Tag (with its Ethertype changed to an S-VLAN Ethertype if required) enabling a B-VLAN tunnel to be specified at the edge of the network. Otherwise, a mapping table or other mechanism (e.g., a hash) may be used to define the B-Tag that specifies the tunnel by which the T-VLAN is transported over the datacenter backbone.

FIG. 4 shows an edge network 460 in communication with a backbone network fabric 462, with a backbone edge boundary 464 therebetween. The edge network 460 can include a number of edge bridge T-VLANs 472 and/or edge bridge C-VLANs 474. The backbone network fabric 462 can include a number of backbone bridge VLANS 476, including B-VLANS and/or C-VLANs. A number of end-nodes 466 are communicatively coupled through a customer/tenant C/T-component 468 to the edge bridge T-VLANs 472 and/or edge bridge C-VLANs 474. The Ca-component 468 at the edge can add or delete C-Tags and/or T-Tags.

The end-nodes 466 communicatively coupled to the edge bridge C-VLANs 474 have MAC addresses assigned thereto, and the end-nodes 466 communicatively coupled to the edge bridge T-VLANs 472 have tMAC addresses assigned thereto, as previously discussed. For T-VLANs 472 tMACs are used for the "inner MAC," which is an end-node 466 exposed in the edge network 460, and MACs are used for the "outer MAC" which is an end-node 466 exposed in the backbone network. Per IEEE 802.1Qah, a MAC exposed in the backbone network can sometimes be referred to as a backbone MAC (B-MAC). For C-VLANs 474, which are not encapsulated, just MACs are used.

The backbone-edge boundary 464 can be a BEB MAC, functionally similar to MAC BEB$_1$ 234-1 and MAC BEB$_M$ 234-M shown in FIG. 2. The edge bridge T-VLANs 472 and/or edge bridge C-VLANs 474 of the edge network 460 can be in communication with a backbone network fabric 462 via an encapsulation E-component 470. The encapsulation E-component 470 can encapsulate frame format "D" packets into frame format "E" packets, and can de-encapsulates frame format "E" packets into frame format "D" packets. The encapsulation E-component 470 can pass through frame format "C" packets unmodified.

The network components shown in FIG. 4 may be implemented in a single device or multiple devices, which may be either virtual (i.e., implemented in software) or physical. The edge bridges (e.g., 472, 474) may also operate in Virtual Ethernet Port Aggregator (VEPA) mode.

FIG. 4 illustrates packets in the network. "A" and "B" are packets that are presented to/from an end-node 466. The packets presented to/from an end-node 466 are 802.1 packets. End-nodes having tMACs are associated with a T-VLAN for a tDatacenter, and end-nodes having MACs are associated with a C-VLAN. As indicated in FIG. 4, end-nodes 466 having MAC addresses forward frame format "A" packets. Frame format "A" packets refer to an IEEE 802.1 packet at an end-node, and includes information arranged as follows: DA/SA/EType/Payload. End-nodes 466 having tMAC addresses forward frame format "B" packets. Frame format "B" packets refer to a T-VLAN IEEE 802.1 packet at an end-node that includes information arranged as follows: tDA/tSA/EType/Payload.

Edge bridge C-VLANs 474 forward frame format "C" packets. Frame format "C" packets refer to a IEEE 802.1 packet at a backbone that includes information arranged as follows: DA/SA/C-TAG/EType/Payload. Edge bridge T-VLANs 472 forward frame format "D" packets. Frame format "D" packets refer to a Frame "D" packet as discussed with respect to FIG. 3 that includes information arranged as follows: tDA/tSA/C-TAG/T-TAG/EType/Payload. Backbone bridge B-VLANS 476 forward frame format "E" packets. Frame format "E" packets refer to a T-VLAN IEEE 802.1Qah encapsulated packet that includes information arranged as follows: DA/SA/B-TAG/T-TAG/tDA/tSA/EType/Payload. Backbone bridge C-VLANS 476 forward frame format "C" packets. For frame format "D," a C-Tag is optional, as previously described. The optional S-Tags for the frame format "C" and "D" are not shown in FIG. 4.

The backbone edge boundary 464 is an architectural boundary defined in the network between the datacenter Backbone L2 Fabric (DBLF) and a set of disjoint edge regions (e.g., edge network 460). Edge regions are disjoint if, and only if a packet must traverse the DBLF to travel from one edge region to another. Forwarding of unicast and/or multicast packets having a frame format "D" in an edge region is qualified by the T-Tag, with port(s) resolved from the T-VID and DA, where DA is the MAC address of the destination using a standard Ethernet learning bridge. In the DBLF itself, forwarding of packets having a frame format "D" is according to the IEEE 802.1Q standard based on the C-Tag port(s) being resolved using the C-VID and DA. More than 16 million VLANs can be provided with MAC addresses being unique within datacenter scope. The packets having a frame format "D" of the VLANs in the edge region may be encapsulated into PBB packets at the DBLF/Edge region boundary. The frame can be restructured such that a T-Tag maps directly to the PBB I-SID, and a C-Tag maps to a PBB B-Tag in a standard PBB frame. The outer destination and source MAC can be determined using standard IEEE 802.1ah mechanisms. This ensures that there is always an end-to-end unique invariant label (the T-VID) and that 16 million VLANs can be supported regardless of their topological configuration.

The PBB virtualizes the VM tMAC addresses to physical MAC addresses and this supports the required scaling of the number of datacenter VMs. Furthermore, the inner tMAC addresses are required only to be unique with T-VLAN scope. The introduction of the packets with Frame Format. D enables the architectural boundary between the DBLF and the Edge regions, and the PBB encapsulation, to be located either in the vSwitches or in an adjacent pSwitch. In the vSwitch implementation, the packets having a frame format "D" are virtual data structures and the PPB encapsulation can be implemented in a vSwitch. For an adjacent pSwitch packets having a frame format "D" can be transmitted on the wire between the pNIC and the adjacent pSwitch in which the PBB encapsulation is preformed by the pSwitch firmware and/or hardware.

A physical and virtual end-node port 466 can be assigned a MAC address within a C-VLAN scope. Therefore, packets associated with each include a C-VLAN identifier (C-VID) identifying the backbone C-VLAN to which this part is assigned, which is a standard 802.1Q bridge function. As a packet travels through the C/T-Component 468, C/T-Component 468 tags the packet with an appropriate C-VID. Forwarding is accomplished by resolving port(s) using the C-VID and a destination MAC address (DA), such as by a look-up table. Look-up tables can be turned into a single flat table by merging the port lists when the tables are combined. The DA for unicast message returns a single port on which to send the packet out. The CA for multi-cast groups returns a port list. A broadcast DA returns the port list for all the ports in the broadcast domain of the particular C-VLAN. The table can be implemented as a learning bridge.

End-node ports on a T-VLAN are assigned a tMAC address within the T-VLAN scope. The ports are also assigned a T-VID identifying the specific T-VLAN to which this port is assigned, and optionally assigned a unique C-VID identifying the C-VLAN with which the T-VLAN is associated. If a C-VID is assigned, the corresponding C-VLAN is used to define the B-VLAN tunnel through the datacenter backbone fabric. A T-VID has global scope and therefore can identify the T-VLAN uniquely within the datacenter without reference to the C-VID. Forwarding in the edge regions is done using the T-VID and tDA to resolve port(s), without reference to the C-VID.

The T-VLAN bridge 472 in the edge region is operates similarly to the C-VLAN bridge 474, except using T-VIDs, which can be 24 bits rather than 12 bits. According to some embodiments, a C-VLAN in the edge region may be regarded as T-VLAN with a specific range of VIDs.

The E-Component 470 of the BEG 464 defines the boundary between the datacenter backbone network fabric 462 and the edge network 460. The E-Component 470 is responsible for the encapsulation and de-encapsulation of T-VLAN packets. Each E-Component 470 is assigned a MAC address, referred to as a BEG MAC address. The E-Component 470 can be an endpoint of tunnels and the BEG MAC address is used for the outer MAC address in frame format E packets. The source MAC address (SA) is the MAC address of the E-Component 470 in which the encapsulation occurs. The DA of the destination BEB for the edge region in which in which the port addressed by a tDA is located is determined by the E-Component to construct the encapsulated packet. The DA is a MAC address with datacenter scope. The DA can be determined by defining a table to resolve the DA using the T-VID and the tDA.

Look-ups in the defined table for destination tDA addresses that are unicast return the MAC address of the E-Component 470 for the BEB 464 corresponding to the edge network 460 in which the end-node 466 with the destination MAC address tDA is located. The defined table may be a learning cache for the unicast MAC addresses. Incoming packets can be used to populate table entries using the SA, tSA, and T-VID in the incoming packets.

Look-ups in the defined table for a tMAC address of a multicast group in a particular T-VLAN return a MAC address of the multicast group for the associated B-VLAN through which the particular T-VLAN tunnels. A multicast group defined by a returned MAC address contains ports for E-Components 470 of the BEBs 464 for all edges with end-points 466 in the multicast group. A B-VLAN multicast may be a superset of the ports actually required. According to some examples, a default can be the broadcast MAC for the associated B-VLAN. Multi-casts that arrive at an E-Component 470 that do not have end-points for the multi-cast group can drop the packets.

A broadcast MAC may be considered as a special case of a multicast MAC. An exact match to define a B-VLAN multi-cast MAC for a multicast group that has only the BEB 464 MAC ports for edge networks 460 in which the particular T-VLAN has end-nodes 466. A default can be to map the T-VLAN broadcast MAC addresses onto the associated B-VLAN broadcast MAC address. Tables for T-VLANs can be combined into a single table.

Sequential flow of packets through the edge networks 460 are indicated in FIG. 4 by the circled numerals (numbers are enclosed in parenthesis in this text description). The circled letters in FIG. 4 correspond to frame format types utilized at respective locations, as previously discussed. Outbound packet flow (i.e., outbound from end-nodes 466) originates at an end-node 466. The registers for a port of an end-node 466 on a specific C-VLAN with a given C-VID use a protocol including a MAC source address (SA). The end-node 466 presents the port, indicated at (1), a packet having frame format "A" addressed to the target DA with the packet source address SA. At (2) the C/T-Component 468, using the C-VID for which the port has been configured, inserts a C-Tag to create a packet having frame format "C" and sends the packet to the edge bridge C-VLAN 474. If the port is set for guest tagging, the C-Tag may already be present and may not need to be added.

The edge bridge C-VLAN 474 resolves (e.g., looks-up in a table) port(s) using the C-VID and DA, and forwards the packet for the unicast or multicast to these ports, at indicated at (3). If an appropriate entry is not populated in the forwarding table, edge bridge C-VLAN 474 floods an unknown unicast or multicast message to the corresponding port list in the forwarding table for these messages. Ports on the edge bridge C-VLAN 474 are connected to the B-VLAN and/or C-VLAN backbone bridges 476 through the encapsulation function 470. The packet having frame format "C" is passed transparently through the encapsulation function 470, as shown at (7), without modification to a B-VLAN and/or C-VLAN backbone bridge 476, as shown at (8). The B-VLAN and/or C-VLAN backbone bridge 476 forwards the packet by resolving port(s) using the C-VID and DA, flooding if it does not have an entry in a look-up table for the resolved port(s).

Outbound packet flow for a T-VLAN begins at an end-node 466. The end-node 466 registers for a port on a specific T-VLAN with a given T-VID and an associated C-VID use a protocol including a tMAC source address (tSA). As indicated at (4), the end-node presents the port a standard 802.1 packet [B]. The packet is addressed to a target tDA with a port address tSA. Outbound packets for a T-VLAN have a similar frame format to outbound packets having frame format "A," the difference being the scope of the tMAC address versus the scope of a MAC address, which is not apparent to a particular end node 466.

As indicated at (5), the C/T-Component 468 uses the C-VID and T-VID assigned to the resolved port in its configuration to insert a C-Tag and T-Tag into the packet, creating a packet of frame format "D." If the port is set for guest tagging, the C-Tag and T-Tag may already be present and may not need to be added. As indicated at (6), the edge bridge T-VLAN 472 looks up port(s) (e.g., in a table) using the T-VID and tDA to resolve the port(s), and forwards the packet for the unicast or multicast to the resolved ports. If a particular entry is not populated in the forwarding table, the edge bridge T-VLAN 472 can send an unknown unicast or multicast message to the corresponding port list in the forwarding table for these messages.

Packets forwarded to the backbone network fabric 476 to reach their destination pass through the encapsulation function 470, as indicated at (7). If the packet, having frame format "D" includes a C-Tag, the C-Tag may be used to construct a B-Tag with its Ethertype changed to ET-S if required. If the packet, having frame format "D," does not include a C-Tag, then the B-Tag for the tunneling VLAN is determined by the E-component 470. Such tunneling can be provided by a mapping table for resolving a T-VID into a B-VID, or by a hashing of the frame format "D" packet header fields to define the B-VID.

The encapsulation of the packet having a frame format "D" into a packet having a frame format "E" utilizes the DA. A mapping function resolves the DA from the T-VID and tDA, for example, by look-up table. If there is a match, the encapsulated packet is constructed, and the packet is forwarded to the B-VLAN and/or C-VLAN backbone bridge 476, as shown at (8). If an entry in a look-up table is not populated, the packet can be flooded by setting the DA to the broadcast MAC for the associated C-VLAN. The B-VLAN and/or C-VLAN backbone bridge 476 can forward the packet to port(s) resolved using the C-VID and DA, flooding if B-VLAN and/or C-VLAN backbone bridge 476 does not have a table entry.

Inbound packets (i.e., inbound to end-nodes 466) that originate in the backbone network fabric 462, as indicated at (8), are forwarded by the B-VLAN and/or C-VLAN backbone bridge 476 to the E-Component 470, as indicated at (7). A packet is inspected to determine whether the packet is a packet having frame format "C" (i.e., indicating association with a C-VLAN) or a frame format "E" (i.e., indicating association with a T-VLAN). Packets having a frame format "C" are passed through the E-Component 470 unmodified. As the packet having a frame format "C" arrives at an edge bridge C-VLAN 474, as indicated at (3), a virtual Ethernet bridge (VEB) can perform a looks up (e.g., in a table) to resolve pots) using the C-VID and DA.

If a match entry is not found in the look-up table, the packet can be discarded. If a matching table entry is found, the packet can be forwarded to the ports in the port list. In addition, a forwarding table can be checked to determine whether an entry is indexed by the source MAC address (SA) of the incoming packet for this C-VID. If not, the VEB can learn the association and add the port on which it arrived to the port list for the row in the look-up table. With respect to a multicast response, the ports for multiple incoming packets from a multicast group with a particular SA can be added to the port list. As the packet is forwarded to the C/T-Component 468, as indicated at (2), the C/T-Component 468 strips the C-Tag (unless the port is configured for guest tagging) and presents the packet to the appropriate end-node 466, as indicated at (1). If a port is configured for guest tagging, the packet can be passed through the C/T-Component 468 unmodified.

With respect to inbound packet flow for a T-VLAN packet having frame format "E," the E-Component 470 can check whether the DA address on the packet matches the E-Component 470 BEB 464 MAC address, or whether the packet is a broadcast, unknown unicast, or multicast message. If the packet is none of these, the packet can be discarded. The E-component may also learn the association of the tSA and T-VID to SA of the encapsulating packet and add this to its mapping table for use in encapsulating outbound packets. Otherwise, the E-Component 470 strips the outer MAC header from the packet and converts the packet from a frame format "E" packet into a frame format "D" packet. If the T-VLAN is configured to include an optional C-Tag, then a B-Tag can be used for the C-Tag (with a change of Ethertype from ET-S to ET-C if necessary). As the packet is forwarded to the edge bridge T-VLAN 472, as indicated at (6), the edge bridge T-VLAN 472 can perform a look-up (e.g., in a forwarding table) to resolve the pots) using the T-VID and tDA.

If a matching table entry is not found, the packet can be discarded. If a matching table entry is found, the packet can be forwarded to the ports in the port list. The edge bridge T-VLAN 472 can also check the forwarding table to see whether an entry indexed by the tSA of the incoming packet for the packets T-VID exists. If not, the port on which the packet arrived can be added to the port list. If a multicast response, the ports for multiple incoming packets from the multicast group with a particular tSA can be added to the port list. As indicated at (5), as the packet reaches the C/T-Component 468, the C/T-Component 468 can remove the C-Tag and T-Tag from the packet (unless the port is configured for guest tagging) and send the to the appropriate end-node 466, as indicated at (4). If the port is configured for guest tagging the packet can be passed through the C/T-Component 468 unmodified.

Figure 5:
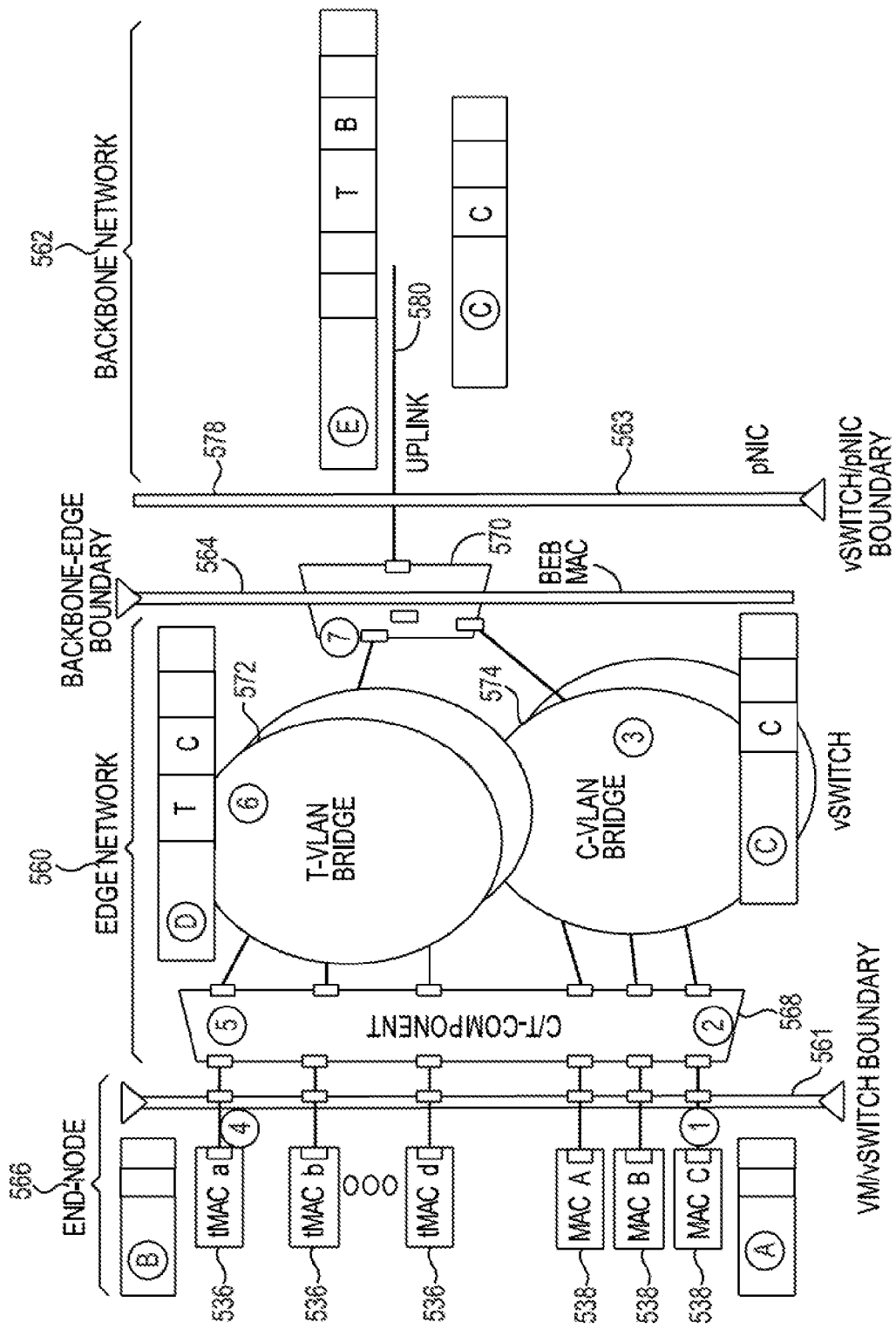
FIG. 5 illustrates a backbone-edge bridge for a vSwitch according to the present disclosure.

FIG. 5 illustrates a backbone-edge bridge for a vSwitch according to the present disclosure. A T-VLAN backbone-edge bridge (BEB) may be implemented in a number of different elements in the underlying network. For example, the BEB may be implemented as a vSwitch resident in a hypervisor, in a pNIC, and/or in a pSwitch. FIG. 5 illustrates a BEB implemented in a vSwitch. Where a BEB is implemented in a pNIC, the ports on the vNICS on the VMs are directly mapped onto ports on the pNIC through a hypervisor cut-through. Packets having frame format D are virtual packets and do not appear on the wire.

FIG. 5 shows an edge network 560 in communication with a backbone network 562, with a backbone edge boundary 564 therebetween. The edge network 560 can include a number of bridge T-VLANs 572 and/or bridge C-VLANs 574. A number of end-nodes 566 are communicatively coupled through a C/T-component 568 to the bridge T-VLANs 572 and/or bridge C-VLANs 574. The C/T-component 568 at the edge can add or delete C-Tags and/or T-Tags, FIG. 5 is architecturally and operationally similar to the architecture and operation shown and described with respect to FIG. 4, with the exception of the backbone network 562 (i.e., a pNIC) in place of the backbone network fabric 462. The backbone network 562 includes an uplink 580 (in contrast to the B-VLAN and/or C-VLAN backbone bridges 476 of the backbone network fabric 462). FIG. 5 shows a boundary between a VM and vSwitch at 561, and a boundary between the vSwitch and pNIC at 563.

Referring to FIG. 5, the BEB MAC 564 can be a MAC address of a pNIC channel. Encapsulation and a forwarding bridge (including a learning cache for encapsulation mapping) can be implemented in software executing on a computing device. An IEEE 802.1Qad packet having frame format "C" or an IEEE 802.1Qah packet having frame format "E" can be presented to the pNIC. Packets having frame format "D" are virtual packets within a vSwitch (a vSwitch being implemented within a pNIC 562 as illustrated in FIG. 1). The pNIC 562 need operate to forward the IEEE 802.1Q packets and thus can be T-VLAN unaware. The boundary between an edge network 560 and a backbone network fabric (not shown in FIG. 5) is through a vSwitch. A backbone bridge (e.g., 572, 574) can be implemented in an adjacent pSwitch (i.e., adjacent the vSwitch implemented in pNIC 562).

A vSwitch implementation of a VEB need not use a learning mechanism to populate a look-up table with entries to resolve port(s) mappings to C-VID and DA). The entries can be set by a control plane for all ports that are local to the bridge for the vSwitch and can be determined. Forwarding tables can be simplified so that only local ports appear as entries. That is, only ports local to a vSwitch-implemented VEB appear in the table. If a particular C-VID and DA combination does not match an entry in the table, a packet can be sent out the uplink 580. Unknown unicast and multicast messages are not sent locally, and can be sent out the uplink 580 for broadcast throughout a particular C-VLAN. Therefore, no learning is used to update the local table entries.

With respect to a T-VLAN, the VEB for T-VLANs and C-VLANs can be the same functionality, with the data structure of the table changed to accommodate a 24 bit T-VID instead of a 12 bit C-VID. The encapsulation function 570 utilizes learning to populate a table that resolves a DA using a T-VID and tDA. The SA can be set to the MAC of a virtual BEB.

Where a BEB functionality is implemented in a pNIC, the T-VLAN BEB functionality can be implemented in the pNIC hardware. The nPorts can be associated with virtual functions (VF) implemented at the pNIC-PCIe interface. The VFs may be layered on top of SR-IOV that enables port queues to be mapped directly into user space. The C/T-Component 568, bridge T-VLANs 572 and/or bridge C-VLANs 574, and encapsulation E-Component 570 can be functions performed by the pNIC internal firmware and/or hardware. The BEB function 564 can exist between the edge network 560 and the backbone network 578.

The vNICs on the VMs are directly mapped onto the nPorts on the pNIC through a hypervisor cut-through. The pNIC implements learning caches. A bridge T-VLANs 572 and/or bridge C-VLANs 574 can forward packets using the T-VID and tDA to resolve nPort(s). Packets can be forwarded by a bridge C-VLANs 574 using the C-VID and DA to resolve port(s). A pNIC 562 can encapsulate packets for a T-VLAN as follows. Registers for each port give the values of the tSA, T-VID, SA, and if the T-VLAN packets have a C-Tag, the C-VID (i.e., of the C-Tag). If a T-VLAN is configured not to have a C-Tag, then a B-VID is determined from a lookup table using the T-VID or a hashing mechanism. The outer destination MAC address can be determined from a learning cache look-up using the T-VID and tDA, A pNIC nBEB can present a packet having an IEEE 802.1Q frame format "C" for C-VLAN ports or a fully encapsulated IEEE 802.1Qah T-VLAN packet having frame format "E" on an external link to a T-VLAN-unaware pSwitch.

Figure 6:
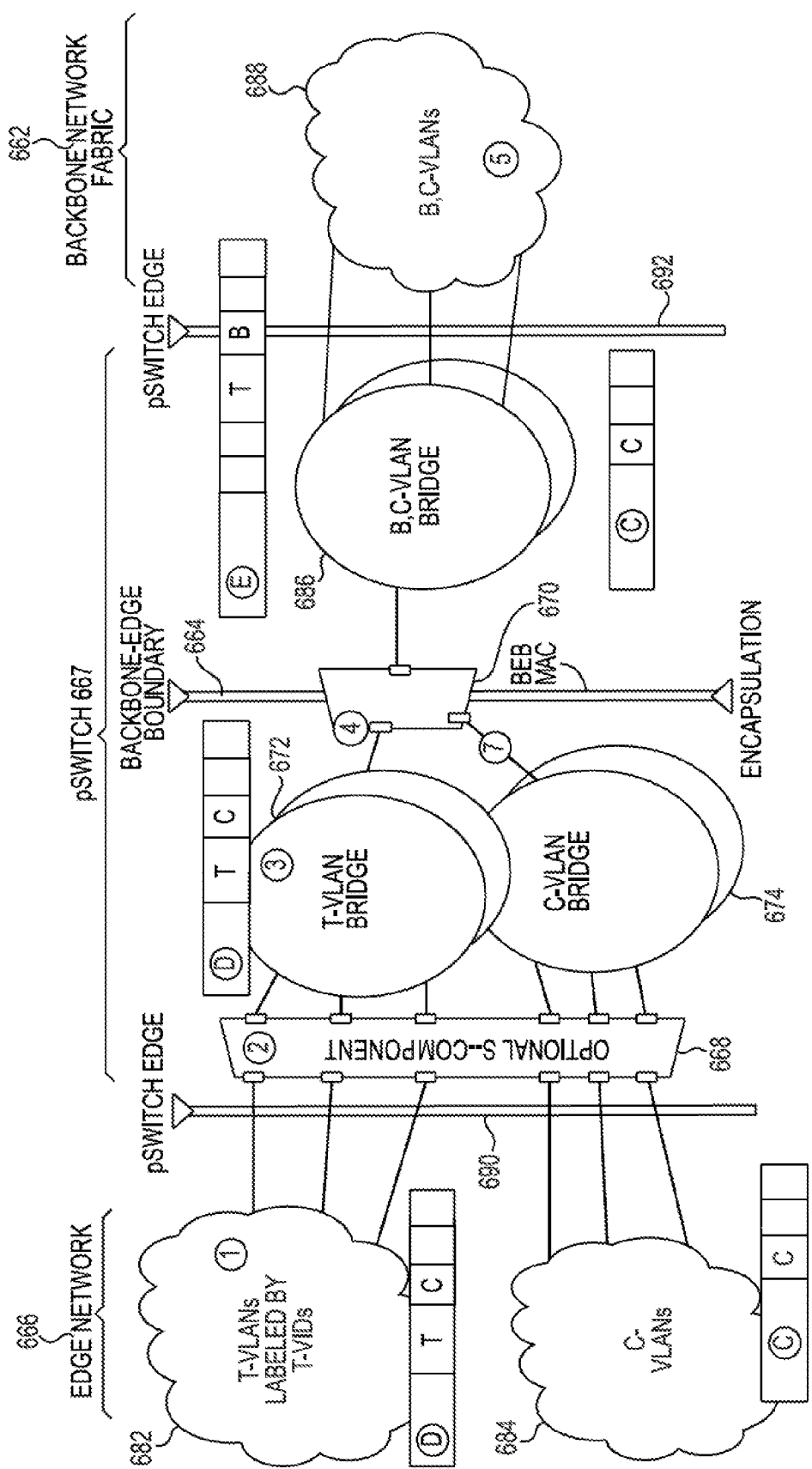
FIG. 6 illustrates a backbone-edge bridge for a pSwitch according to the present disclosure.

FIG. 6 illustrates a backbone-edge bridge for a pSwitch according to the present disclosure. FIG. 6 shows an edge network 666 in communication with a backbone network fabric 662, having a pSwitch 667 therebetween. The pSwitch edges are shown at 690 (first edge) and 692 (second edge). A backbone edge boundary (BEB) function 664 is located in the pSwitch 667, as shown. The edge network 660 can include a number of T-VLANs 682 (labeled by T-VIDs) and/or C-VLANs 684. The T-VLANs 682 and/or C-VLANs 684 are communicatively coupled through an optional S-component 668 to one or more bridge T-VLANs 672 and/or bridge C-VLANs 674. The S-component 668 at the edge can add or delete S-Tags.

The BEB function 664 can be implemented in the pSwitch 667 (e.g., an adjacent pSwitch). A vSwitch (e.g., executed within a pSwitch) can support both C-VLANs and T-VLANs. Packets with frame format "C" and "D" are "physical" packets transported on the wire between a pNIC and an adjacent pSwitch (e.g., pSwitch 667), and such packet transport can also support VERA mode with an appropriately enabled adjacent pSwitch.

The T-VLANs 682 can be implemented in an edge vSwitch and pNIC. A packet on T-VLAN 682, as indicated at (1), can have a frame format "D" and is sent on the wire to the adjacent pSwitch. The packet can pass through the optional S-Component 668 for VEPA, as indicated at (2), to a T-VLAN bridge 672, as indicated at (3). The a T-VLAN bridge 672 in the edge forwards the packets to port(s) resolved using the T-VID and tDA. Packets forwarded to the backbone network fabric 662, as indicated at (5) in order to reach their destination end-nodes are passed to the encapsulation E-Component 670, as indicated at (4). The encapsulation E-Component 670 reformats the packet into a packet having frame format "E" and determines the DA MAC address using a learning cache, as previously described. Packets of C-VLAN bridge 674 having frame format "C" can be passed through the encapsulation E-Component 670 unmodified.

Packets inbound to the edge network 666 from the backbone network fabric 662 are categorized as to having frame format "C" or "E." Packets having frame format "C," and destined to the C-VLANs 684, are passed through the encapsulation E-Component 670 unmodified. Packets having frame format "E," and destined to the T-VLANs 682, are de-encapsulated to form a packet having frame format "D," and forwarded via the T-VLAN bridge 672.

Support for a multichannel Virtual Ethernet Port Aggregator (VEPA) mode of a vSwitch can be extended to a T-VLAN-enabled adjacent switch. A vSwitch/pNIC boundary (e.g., 563 shown in FIG. 5) in VEPA mode emits packets having frame format "C" and/or "D" with an S-Tag added by an S-Component 668. The S-Component 668 can remove an S-Tag from a packet flowing in the opposite direction. A packet being processed by an optional S-Component 668, as indicated at (2), can be forwarded using the VEPA modification of the forwarding edge bridge (e.g., T-VLAN bridge 672 or C-VLAN bridge 674). The size of the VID, whether a 24 bit T-VID or a 12 bit C-VID, does not affect the semantics of a VEPA operation.

Regarding a BEB function in a pSwitch for legacy pSwitches, the BEB function can be implemented in a pSwitch, as shown in FIG. 6 at 664. A subset of C-VLANs 684 in the edge network 666 may be mapped into T-VLANs (e.g., 682). That is, in the edge network certain C-VIDs can be designated to map to a T-VID in the pSwitch BEB 664, and be encapsulated so that the mapped C-VLAN 684 becomes part of a given T-VLAN 682, which enables legacy pSwitches and networks that comprehend C-VLANs, but are not T-VLAN aware, to participate in a T-VLAN-enabled datacenter.

More specifically, the BEB function 664 can be implemented in a pSwitch 667 to enable hardware networks and servers that are not T-VLAN enabled to participate in a datacenter with tenant contexts. According to some embodiments of the present disclosure, a C-VLAN in the edge may be a C-VLAN 684 operating as discussed previously or may be mapped into a T-VLAN 682 (referred to hereinafter as a tC-VLAN). The E-Component 670 maintains a table of which C-VIDs are associated with a C-VLAN 684, which are processed as discussed previously. That is, packets including a C-VID associated with a C-VLAN 684 are forward to port(s) resolved using the C-VID and DA and passed transparently through the encapsulation E-Component 670 without modification. Packets including a C-VID associated with a tC-VLAN, which is mapped into a T-VLAN 682 have a same frame format "C" as unmapped C-VLANs 684 but are interpreted in a slightly different manner.

In a C-VLAN bridge 674, packets can be forwarded using a 12 bit VID in the same manner previously described. However, tC-VLAN packets are forwarded to the backbone network fabric 662 through the encapsulation E-Component 670. The encapsulation E-Component 670 identifies these tC-VLAN packets by looking-up the tC-VIDs in one or more tables maintained by the encapsulation E-Component 670, which can map a 12 bit tC-VID to a 24 bit T-VID. The encapsulation E-Component 670 can also have a learning cache to determine the DA MAC address using the T-VID and tDA. Conversely on the de-encapsulation, the encapsulation E-Component 670 uses the one or more look-up tables to map a 24 bit T-VID to a 12 bit tC-VID.

Although specific examples have been illustrated and described herein, those of ordinary skill in the art will appreciate that an arrangement calculated to achieve the same results can be substituted for the specific examples shown. This disclosure is intended to cover adaptations or variations of one or more examples provided herein. The above description has been made in an illustrative fashion, and not a restrictive one. Combination of the above examples, and other examples not specifically described herein will be apparent upon reviewing the above description. Therefore, the scope of one or more examples of the present disclosure should be determined with reference to the appended claims, along with the full range of equivalents.

Throughout the specification and claims, the meanings identified below do not necessarily limit the terms, but merely provide illustrative examples for the terms. The meaning of "a," "an," and "the" includes plural reference, and the meaning of "in" includes "in" and "on." "Embodiment," as used herein, does not necessarily refer to the same embodiment, although it may.

In the foregoing discussion of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of this disclosure.

Some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for network virtualization, comprising:
   providing, by a datacenter having physical and virtual resources, a number of virtual tenant datacenters (tDatacenters), each tDatacenter being isolated from other tDatacenters,
   associating a respective tenant virtual local area network (T-VLAN) to each of the number of tDatacenters;
   associating a value of an end-to-end invariant network virtual local area network (VLAN) identification (VID) label (T-VID) to a particular T-VLAN, wherein the particular T-VLAN is one of a plurality of T-VLANs associated with a customer virtual local area network (C-VLAN),
   wherein the T-VID has more possible values than a customer VID (C-VID) and the T-VID is invariant within the data center, the T-VID has one of more than 4096 possible values that identify packets associated with a particular T-VLAN, and an encapsulating functionality at a BEB passes packets having the C-VID unmodified and passes packets having the T-VID after processing to modify an IEEE 802.1 packet to a IEEE 802.1Qah encapsulated packet or modify an IEEE 802.1Qah encapsulated packet to a IEEE 802.1 packet;
   resolving a destination address (DA) of a packet;
   encapsulating the packet using the T-VID at a backbone edge bridge (BEB); and
   sending the encapsulated packet from the BEB over an IEEE 802.1Q network core layer 2 fabric to a second BEB, wherein the encapsulated packet is de-encapsulated at the second BEB.

2. The method of claim 1, further comprising encapsulating each T-VLAN packet as an IEEE 802.1Qah provider backbone bridging service instance in an IEEE 802.1Qah-compliant frame, wherein the datacenter is segmented into a backbone region and a number of disjoint edge regions with a backbone edge bridge (BEB) at each boundary therebetween.

3. The method of claim 2, further comprising setting a service identifier of the IEEE 802.1 Qah-compliant frame to the T-VID of the particular T-VLAN.

4. The method of claim 2, further comprising determining a backbone VID (B-VID) of a backbone virtual local area network (B-VLAN) at an edge from a customer VID (C-VID) of an optional customer virtual local area network (C-VLAN) tag in the modified network packet associated with the particular T-VLAN.

5. The method of claim 2, further comprising implementing the BEB in a virtual switch (vSwitch).

6. The method of claim 2, wherein encapsulating each T-VLAN packet includes mapping many tenant media access control addresses (tMACs) of the T-VLAN onto Backbone MAC (B-MAC) addresses, the tMACs having T-VLAN scope.

7. The method of claim 1, wherein associating a value of T-VID to a particular T-VLAN includes providing a 24-bit T-VID.

8. The method of claim 7, further comprising:
   resolving the DA of the packet using the 24-bit T-VID;
   encapsulating the packet using the T-VID at the BEB based on the 24-bit T-VID;
   wherein the de-encapsulated packet is forwarded from the second BEB based on the resolved first DA.

9. The method of claim 1, wherein associating a T-VLAN to each of the number of tDatacenters includes operating the datacenter such that each T-VLAN has same semantics as a customer VLAN (C-VLAN) except for a larger address space.

10. The method of claim 1, wherein modifying the network packet associated with the particular T-VLAN includes addition and/or removal of tags by a Customer/Tenant C/T-component at a boundary between a virtual machine (VM) and a virtual switch (vSwitch), with ports of the vSwitch interfacing with virtual network interface controllers (vNICs) of the VM.

11. A network system, comprising:
an edge network including a number of edge bridge customer virtual local area networks C-VLANs and edge bridge tenant virtual local area network T-VLANs communicatively coupled to an encapsulating functionality at a backbone-edge boundary (BEB); and
a plurality of end-nodes communicatively coupled to the number of edge bridge C-VLANs processing packets having a C-VID and edge bridge T-VLANs wherein at least one of the C-VLANs has a plurality of T-VLANs associated therewith, the T-VLANs processing packets, each packet having a T-VID that identifies one of the T-VLANs, a first portion of the plurality of end-nodes being respectively assigned MAC addresses and a second portion of the plurality of end-nodes being respectively assigned tMAC addresses, wherein each of the plurality of end-nodes includes a processor and a memory,
wherein the T-VID has more possible values than a customer VID (C-VID) and the T-VID is invariant within the edge network, the T-VID has one of more than 4096 possible values that identify packets associated with a particular T-VLAN, and the encapsulating functionality at the BEB passes packets having the C-VID unmodified and passes packets having the T-VID after processing to modify an IEEE 802.1 packet to a IEEE 802.1Qah encapsulated packet or modify an IEEE 802.1Qah encapsulated packet to a IEEE 802.1 packet,
wherein a destination address (DA) of a packet is resolved, the packet is encapsulated using the T-VID at a backbone edge bridge (BEB), and the encapsulated packet is de-encapsulated at a second BEB.

12. The network system of claim 11, wherein the BEB and the encapsulating functionality are implemented in a pSwitch between the edge network and a backbone network fabric.

13. The network system of claim 11, wherein the BEB and the encapsulating functionality are implemented in a vSwitch between the plurality of end-nodes and a backbone network fabric, wherein the edge network is implemented in the vSwitch.

14. A non-transitory computer-readable medium having computer-readable instructions stored thereon that, when executed by one or more processors, cause the one or more processors to:
associate a tenant virtual local area network (T-VLAN) to each of a number of virtual tenant datacenters (tDatacenters), each tDatacenter being isolated from other tDatacenters;
associate a value of an end-to-end invariant network virtual local area network (VLAN) identification (VID) label (T-VID) to a particular T-VLAN wherein the particular T-VLAN is one of a plurality of T-VLANs associated with a customer virtual local area network (C-VLAN),
wherein the T-VID has more possible values than a customer VID (C-VID) and the T-VID is invariant within the data center, the T-VID has one of more than 4096 possible values that identify packets associated with a particular T-VLAN, and an encapsulating functionality at a BEB passes packets having the C-VID unmodified and passes packets having the T-VID after processing to modify an IEEE 802.1 packet to a IEEE 802.1Qah encapsulated packet or modify an IEEE 802.1Qah encapsulated packet to a IEEE 802.1 packet;
resolve a destination address (DA) of a packet;
encapsulate the packet using the T-VID at a backbone edge bridge (BEB); and
send the encapsulated packet from the BEB over an IEEE 802.1Q network core layer 2 fabric to a second BEB, wherein the encapsulated packet is de-encapsulated at the second BEB.

15. The non-transitory computer-readable medium of claim 14, further having computer-readable instructions stored thereon that, if executed by one or more processors, cause the one or more processors to determine a backbone VID (B-VID) of a backbone virtual local area network (B-VLAN) at an edge from a customer VID (C-VID) of an optional customer virtual local area network (C-VLAN) tag in the modified network packet associated with the particular T-VLAN.

* * * * *